INVENTOR.
WILLIAM E. SCOVILLE
BY George Sipkin
George E. Pearson
ATTORNEYS

Jan. 7, 1958 W. E. SCOVILLE 2,819,339

R. F. PHASE SHIFT KEYING SYSTEM FOR TELETYPE COMMUNICATION

Filed Jan. 12, 1956 2 Sheets-Sheet 2

INVENTOR.
WILLIAM E. SCOVILLE
BY George Sipkin
George E. Pearson
ATTORNEYS

United States Patent Office 2,819,339

Patented Jan. 7, 1958

2,819,339

R. F. PHASE SHIFT KEYING SYSTEM FOR TELETYPE COMMUNICATION

William E. Scoville, Albuquerque, N. Mex.

Application January 12, 1956, Serial No. 558,810

3 Claims. (Cl. 178—66)

(Granted under Title 35, U. S. Code (1952), sec. 266)

The invention described herein may be manufactured and used by or for the Government of the United States of America for governmental purposes without the payment of any royalties thereon or therefor.

This invention relates to keying systems for teletypewriter communication and more particularly to an R. F. phase shift keying system employing a coherent detection technique to obviate the limitations imposed by noise in conventional systems.

Heretofore, frequency shift keyers and receiving converters employing filters and discriminators have been used in keying the teletypewriter printer mechanism. These conventional radio teletypewriter systems operate at frequencies that permit only relatively short ranges. An obvious attempt to extend the range would be to operate at lower frequencies. At lower frequencies, such as in the V. L. F. spectrum, the bandwidth is an important consideration and is limited due to the physical characteristics of the antenna. Either the design of the antenna must be changed, not a practical approach, or means must be found to use a smaller bandwidth. Bandwidth for any system must be proportional to the speed of operation desired. Conventional systems permit 60 to 100 words per minute transmission at their designed frequencies but in narrowing the bandwidth to permit V. L. F. operation, a maximum of only 20 words per minute is possible, obviously an undesirable situation. Therefore, the bandwidth in V. L. F. operation is not wide enough for application to conventional system techniques. Another problem in extending the range of teletypewriter transmission is the decreased signal to noise ratio which reduces reception reliability.

The phase shift keying system of the present invention utilizes the V. L. F. spectrum to extend the range of transmission using standard terminal printing equipment. The necessarily smaller bandwidth in the V. L. F. spectrum is used without decrease in operating speed. The system performs reliably even with greater noise to signal ratio usually found in extended range reception. The teletypewriter keyer shifts the phase of the R. F. signal applied to the transmitter. The signal is received at the receiving location and is applied to an R. F. phase detector along with a locally generated signal of the same frequency and shifted in phase. The output of the detector is used to generate a D.-C. potential in accordance with the phase of the applied R. F. signal. This potential in turn is used to activate the teletypewriter printer mechanism.

An object of the present invention is the provision of a phase shift keying system for teletypewriter communication.

Another object is the provision of a phase shift system of teletypewriter communication utilizing a coherent detection technique.

Still another object of this invention is the provision of a novel coherent detector for use in a phase shift keying system.

A further object is the provision of a keying system operable over a longer range in the presence of low signal to noise ratio through the use of a phase shifting technique over a smaller bandwidth in the V. L. F. spectrum.

Other objects and many of the attendant advantages of this invention will be readily appreciated as the same becomes better understood by reference to the following detailed description when considered in connection with the accompanying drawings wherein.

Figure 1:
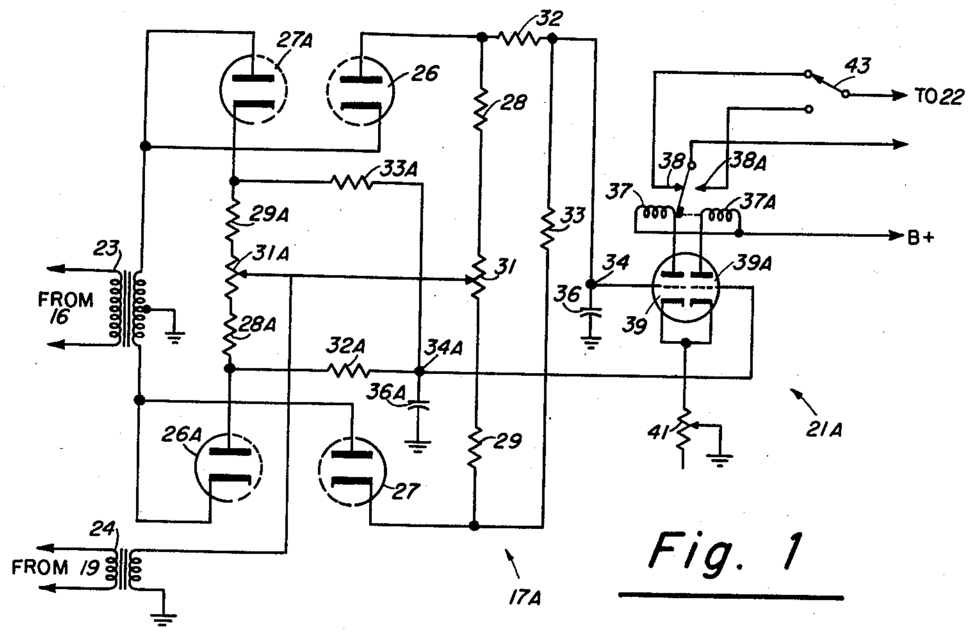
Fig. 1 is a circuit diagram of the coherent detector and relay circuit.
Figure 2:
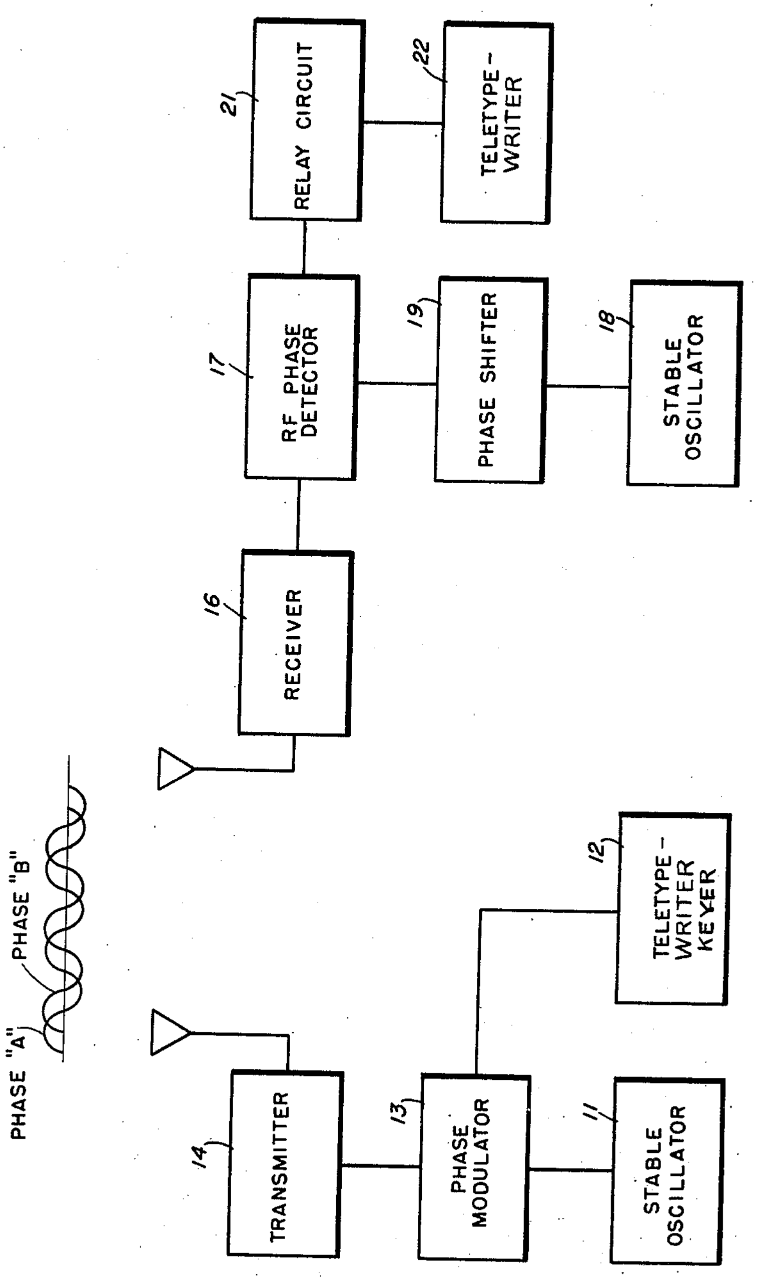
Fig. 2 is a block diagram of the keying system.

Referring now to the drawings wherein like numerals designate like parts throughout the several views, Fig. 2 shows a block diagram of the keying system. The transmitting station comprises oscillator 11, teletypewriter keyer 12, phase modulator 13, and transmitter 14. The teletypewriter keyer signal mixed with the R. F. carrier from oscillator 11 in phase modulator 13 shifts or modulates the phase of the R. F. applied to transmitter 14 a total of 90 degrees in accordance with the teletypewriter code. Phase "A" denotes the mark condition and phase "B" the space condition. The signal is received at the receiving station by receiver 16 and applied to the R. F. phase detector 17 along with a locally generated signal of the same frequency from oscillator 18 which is phase shifted at 19 until a 45 degree relationship exists between the voltages at the secondaries of transformers shown in Fig. 1 and Fig. 3. The resultant voltage is fed into relay circuit 21 which actuates teletypewriter 22.

Figure 3:
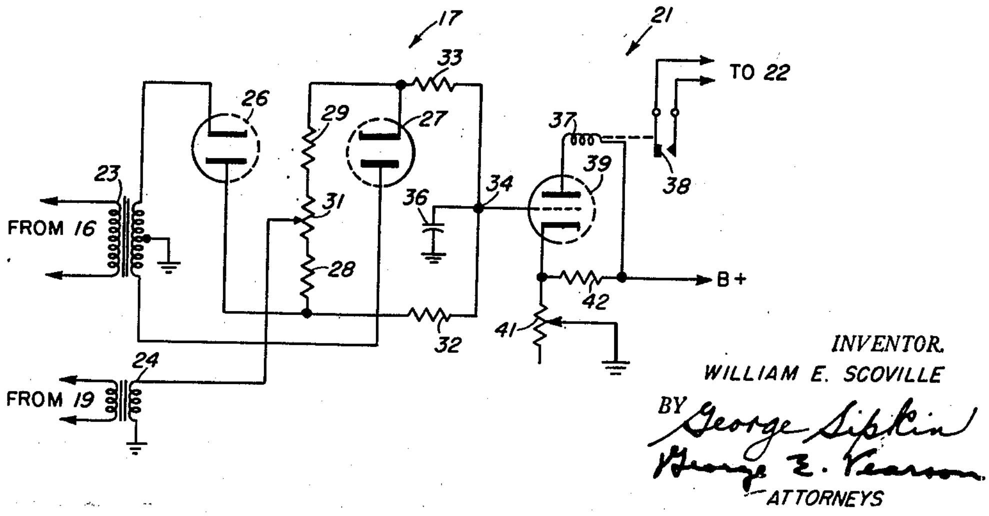
Fig. 3 shows a single phase detector to facilitate a better understanding of the basic phase shift function.

Referring now to Fig. 3, there is shown a single phase detector 17 of the type used. Receiver 16 is connected to the primary winding of transformer 23 and the output of phase shifter 19 is connected to the primary winding of transformer 24. Diodes 26 and 27 are connected in back to back relationship to the secondary winding of transformer 23 which is grounded at the center. Two groups of resistors are connected in parallel between the plate of diode 26 and the cathode of diode 27. One group comprises two resistors 28, 29 of equal value and a smaller adjusting resistor or potentiometer 31 connected in series. One end of the secondary of transformer 24 is connected to ground and the other end is connected to the potentiometer 31. The other group comprises two resistors 32, 33 of equal value connected in series. Point 34 between resistors 32 and 33 is grounded through condenser 36 and forms the output from the detector 17. One end of relay 37, which opens and closes switch 38 to activate teletypewriter 22, is connected to the plate of triode 39 and the other end is connected to B+. The cathode is connected to ground through a bias adjusting resistor 41 and to B+ through bypass resistor 42. The grid of tube 39 is connected to the detector output at point 34.

In operation the phase of the local signal is adjusted until a 45 degree relationship exists between the voltages at the secondaries of transformers 23 and 24. The signal amplitudes should be about 20 volts for the local signal and about 5 volts from the remote signal. Under these amplitude conditions, the D.-C. voltage level at point 34 will be +3.5 volts with respect to ground. This is for the mark condition. When a space signal is transmitted the phase relationship at the secondaries of the transformers 23, 24 becomes 135 degrees. In this condition the D.-C. voltage at point 34 becomes −3.5 volts with respect to ground. The bias adjustment at 41 should be adjusted so that the relay switch 38 just closes when the grid of tube 39 is shorted to ground. Under these conditions the relay contacts will be closed when the +3.5 volt signal is applied to the grid and open when the −3.5 volt signal is applied. Thus the opening and closing of the relay contacts correspond with the instantaneous phase of the transmitted signal which is shifted in accordance with the teletypewriter code. In this manner the local teletype loop opens and closes in accordance with the teletypewriter signal transmitted.

Reference is now made to Fig. 1 which shows the preferred embodiment of the coherent detector and relay circuit. Here numerals identifying parts in Fig. 2 identify like parts. Numerals followed by "A" designate duplicate parts. By using two phase detectors connected in 180° out of phase relationship, a push-pull output is accomplished, permitting use of greater "snap action" in duotriode tube 39, 39A. Thus point 34 is negative and point 34A is positive when the 45 degree relationship exists between the signals at the secondaries of transformers 23, 24 and when the relative phase shifts to 135 degrees the polarity is reversed, actuating the other side of the tube. Coil 37 when energized closes the contact 38 and the other coil 37A when energized closes the contact 38A. Polarity reversing switch 43 is manually operable to complete the teletypewriter loop circuit when either contact 38 and 38A is closed so that the loop may be energized when either mark or space condition is effected as desired. The common cathode resistor 41 also contributes to the more positive and rapid transition from one condition to the other, or snap action, since an increase in plate current in one section of the tube will increase the bias on the other section.

Modifications of the preferred embodiment will at once become obvious in light of the above teaching. For example, a clipper amplifier following the phase detector might be used to replace the relay. If the frequency is so low that a shift of 90° occupies more bandwidth than is available, a shift of less than 90° is permissible when more precise adjustments are made. It is therefore to be understood that within the scope of the appended claims, the invention may be practiced otherwise than as specifically described.

What is claimed is:

1. In a keying system for teletypewriter communication, transmitter means generating an R. F. signal denoting mark condition, transmitter phase shifting means for shifting the phase of said signal in accordance with teletypewriter code to denote space condition, receiver signal generating means, phase detection means for producing a voltage variable in amplitude responsive to differences in phase between said transmitter generated signal and said receiver generated signal, said phase detection means comprising rectifying means to convert said R. F. signal to a D.-C. voltage, mixing means for combining said D.-C. voltage with said receiver generated signal to produce a resultant D.-C.voltage output variable in amplitude according to the phase differences between said R. F. signal and said receiver signal, said rectifying means including a second phase detection means connected in push-pull arrangement with said first mentioned phase detection means to produce a second D.-C. output 180° out of phase from said first mentioned output, and second mixing means for combining voltage from said second D.-C. output with said receiver generated signal.

2. In a keying system as in claim 1, first amplifying means responsive to the positive D.-C. output from the first of said mixing means for energizing a first relay coil, second amplifying means responsive to the positive D.-C. output from said second mixing means for energizing a second relay coil, switch means for opening and closing a teletypewriter circuit, one of said relay coils operable to close said switch means and the other of said relay coils operable to open said switch means.

3. In a keying system as in claim 2, said first and second amplifying means comprising tubes having grids connected tubes having grids connected to said first and second mixing means respectively, plates respectively connected to said first and second relay coils, and common adjustable biasing means connected to the cathodes of both said tubes, said common biasing means providing a snap action to more quickly energize each of said relay coils.

References Cited in the file of this patent

UNITED STATES PATENTS

| | | |
|---|---|---|
| 2,282,102 | Tunick | May 5, 1942 |
| 2,471,319 | Gardere | May 24 ,1949 |
| 2,654,025 | Higgins | Sept. 29, 1953 |
| 2,676,245 | Doelz | Apr. 20, 1954 |